United States Patent
Niver et al.

(10) Patent No.: US 7,720,666 B1
(45) Date of Patent: May 18, 2010

(54) METHOD FOR ESTABLISHING BIT ERROR RATE (BER) REQUIREMENT FOR A DATA COMMUNICATION SYSTEM

(75) Inventors: Brett D. Niver, Grafton, MA (US); Qin Wang, Northborough, MA (US); Mohammad Faisal Siddiqui, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 680 days.

(21) Appl. No.: 11/612,761

(22) Filed: Dec. 19, 2006

(51) Int. Cl.
*G06F 7/60* (2006.01)
*G06G 7/62* (2006.01)

(52) U.S. Cl. .............................. 703/17; 703/2

(58) Field of Classification Search ............. 703/2, 703/17
See application file for complete search history.

(56) References Cited

OTHER PUBLICATIONS

Ward et al. "A Data Link Control Protocol for LEO Satellite Networks Providing a Reliable Datagram Service", IEEE/ACM Transactions on Networking. vol. 3, No. 1, Feb. 1995, pp. 91-103.*

* cited by examiner

*Primary Examiner*—Hugh Jones (57) ABSTRACT

A method for determining throughput of a data passing between end points of a data communication system as a function of bit error rate, comprising: generating a mathematical model of the functional relationship between the throughput of data passing from a transmitting one of a pair of end points of a data communication system and a receiving one of the pair of end points and a bit error rate of data received at the receiving one of the pair of end points.

3 Claims, 3 Drawing Sheets

METHOD FOR ESTABLISHING BIT ERROR RATE (BER) REQUIREMENT FOR A DATA COMMUNICATION SYSTEM

TECHNICAL FIELD

This invention relates generally to data communication systems and more particularly to methods for establishing a bit error rate (BER) requirement for such systems.

BACKGROUND

As is known in the art, there is a trade off in establishing the bit error rate (BER), sometimes also referred to in the literature as bit error ratio, in a data communication system. On one hand, a zero BER results in perfect (i.e., error free) packet transmission through the system and thus removes the requirement for any packet retransmission. On the other hand, as the BER is reduced, the cost of the system increases dramatically.

SUMMARY

In accordance with the present invention, a method is provided for determining throughput of a data passing between end points of a data communication system as a function of bit error rate. The method includes generating a mathematical model of the functional relationship between the throughput of data passing from a transmitting one of a pair of end points of a data communication system and a receiving one of the pair of end points and a bit error rate of data received at the receiving one of the pair of end points.

In one embodiment a method is provided for determining throughput of a data passing between end points of a data communication system as a function of bit error rate. The method includes: determining a probability of bit errors in the data passing between the end points through the system; and determining the actual throughput as a function of the determined probability.

In one embodiment, the probability is determined as a function of characteristics of a protocol used for the transmission.

In one embodiment, a method is provided for establishing a bit error rate (BER) requirement a data communication system. The method includes: generating a mathematical model of the functional relationship between throughput of data passing from a transmitting one of a pair of end points of the data communication system and a receiving one of the pair of end points and a bit error rate of data received at the receiving one of the pair of end points; and establishing, from the generated model, the bit error rate (BER) requirement for the data communication system.

In one embodiment, the model is represented by a curve relating system throughput as a function of the bit error rate, such curve having a relatively flat relationship between system throughput \as a function of the bit error rate, BER, for relatively low bit error rates and wherein the system throughput as a function of the bit error rate rapidly decreases for relatively high bit error rates with such curve having an inflection point within a knee-like region between the relatively low bit error rates and the relatively high bit error rates, and wherein the optimal bit error rate is established at a bit error rate proximate the inflection point within the knee-like region of the curve.

In one embodiment, the bit error rate is established at a bit error rate slightly less than the lower bit error rate range of the knee-like region of the curve.

In one embodiment, the model is generated as a function of a time needed for error recovery.

In one embodiment, the system is a serial link system and the model is generated as a function of time for link timeout in the system.

In one embodiment, the system is a serial link system and the model is generated as a function of time for link re-synchronization in the system.

In one embodiment, the model is generated as a function of time required to send a packet of data between the transmitting one of the pair of end points and the receiving one of the pair of end points.

In one embodiment the model is generated as a function of time required process a receive packet.

This method determines the actual throughput of a high-speed serial link as a function of both the BER of the link and the specific semantics of the communication protocol across that link. The method is to use a mathematical model which describes the probabilities of individual and combinatorial bit errors in specific components of the protocol together with their respective impacts.

This method is described herein for ARQ (Automatic Repeat reQuest) protocols which use retransmission as a form of error correction. The probability of causing a retransmission combined with the impact of retransmission is the central factor in determining throughput or performance impact. The impact of BER on ARQ-type protocols also tends to have a non-linear impact on throughput, so a method for determining performance impact as a function of BER and protocol specifics allows for more cost-effective and reliable designs of communication links.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
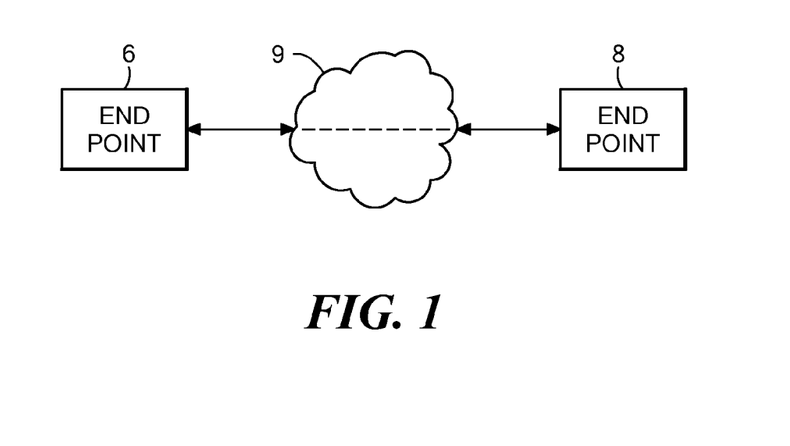
FIG. 1 is a diagram of two end points passing data through a data communication system having a bit error rate, BER, established in accordance with the invention.
Figure 2:
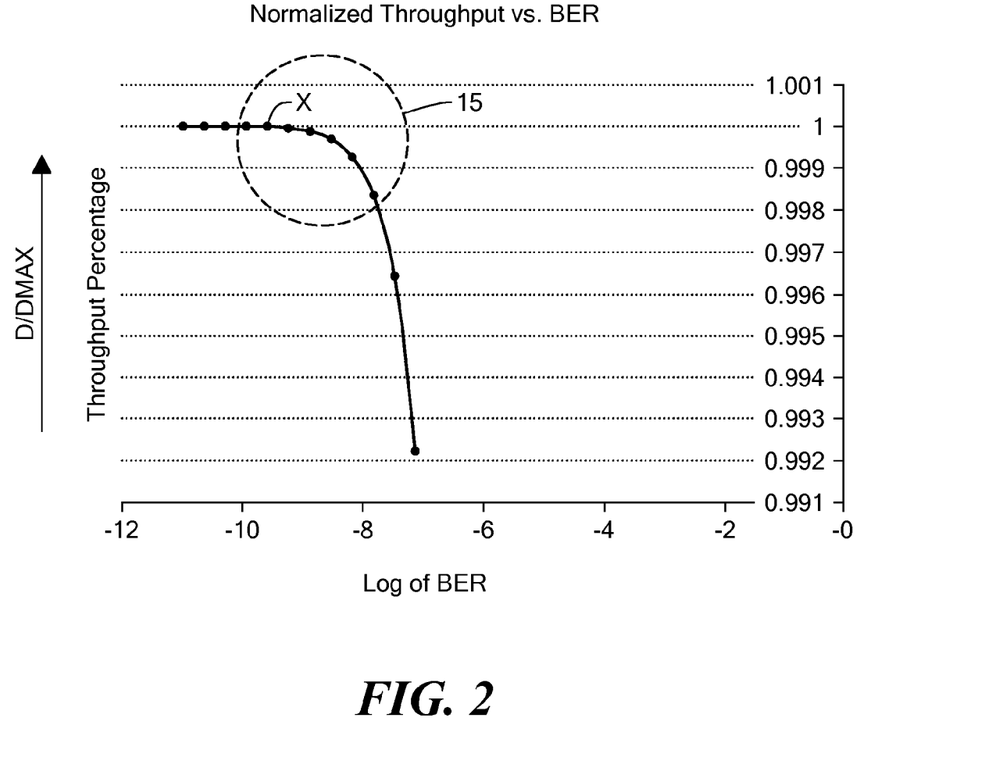
FIG. 2 is a curve generated in accordance with the invention showing a calculated throughput, D, as a function of logBER for the system of FIG. 1.

Referring now to FIG. 1, a data transmission system is shown wherein packets of data are transmitted between end points 6, 8 of a packet switching network 9. As will be described in more detail below, a throughput mathematical model is generated presenting a functional relationship between the throughout of the system as a function of BER. An exemplary function is shown in FIG. 2, where the y-axis is throughput, D, in bits per second normalized with respect to the maximum value of the system throughput, $D_{max}$, so that the maximized value of D is unity, i.e., the y-axis is $D/D_{max}$, and the x-axis is logBER. Then, from such generated function, D as a function of BER, an optimal bit error rate (BER) requirement is established for the systems. For example, referring to FIG. 2, it is noted that the calculated throughput for the system, D, is relatively flat as a function of BER until a knee of the function is reached after which the throughput decreases relatively rapidly with increasing BER. Thus, from such generated function, a BER is established proximate an inflection point within a knee-like region 15, typically for safety, at a BER slightly less than the lower BER range of the inflection point or based on a desired percentage of the throughput ratio, $D/D_{max}$.

In the example presented herein, a performance analysis of the Serial Rapid IO (SRIO) protocol physical link is presented. A mathematical approach is presented to model the throughput, D, of one direction of SRIO physical link. The analysis is based on evaluation of window transmission time (WTT). WTT represents the time needed for a complete window of packets transmission and error recovery time and delays concerning the erroneous packet. It incorporates time needed for packet transmissions, for processing the packets in the receiver queue and acknowledgement for the erroneous packet, for error recovery process (hand shaking between transmitter and receiver to recovery from the error states) and time wasted in possible link timeout and link re-initialization since burst of bit errors could make the link go down.

The performance model considers data transfer from the one endpoint to another endpoint crossing the physical link, here the packet switching network. One endpoint has both transmitter port and receiver port. Here, the example only considers the throughput, D, for one direction, from one endpoint's transmitter to another endpoint's receiver. Here one of endpoints is referred to as the primary endpoint and the other one of the endpoints the secondary endpoint. It is assumed in this example that the primary has always packets ready for transmission. Packets from the primary endpoint with maximum size of 276 bits carry information to the secondary endpoint, along with control symbols (SOP and EOP) with fixed size of 24 bit (before 10b8b encoder/decoder). The secondary endpoint responses with an ACK control symbol PA (Packet Acknowledgement) or PNA (Packet Negative Acknowledgement) indicating the secondary endpoint has accepted the packet or not accepted the packet due to the bit error. Before the ACK is received by the primary endpoint, it keeps transmitting the packets as long as there are enough buffers on the secondary endpoint which is advertised by the secondary endpoint constantly by the status control symbol. Once it receives the PNA control symbol, it immediately stops transmitting any new packets and entered the error-stop state and started the error recovery process. If the ACK symbol indicates the packet is accepted, the packet will not have to be retransmitted. The correctly received packets after the erroneous packet are discarded by the secondary endpoint and have to be retransmitted. If the bit error happens to an ACK control symbol, the primary endpoint could not see the acknowledgement and wait for the link timeout and then initiated the link-request control symbol for the error recovery. If a burst of bit errors happens on the link in a short period of time (256 code groups), the link will go down and re-sync between the two endpoints. If this event happens in the window, we have to also consider the silence and discovery timer for the SRIO physical layer. Although this probability of such event is thin, the impact of such event is too high so as that we should not ignore it.

Explanation of the Parameters in the Flow Chart

The table below lists all the parameters appearing in the flow chart. For each parameter, the description and the way to calculate if there is any are given:

TABLE I

| Symbol | Parameter Description | Unit | Comment |
| --- | --- | --- | --- |
| BER | Bit error rate | NA | A changing parameter in the simulation. The range could be chosen from $10^{-4}$ to $10^{-16}$. |
| $BER_{max}$ | Max BER in the simulation | NA | The max BER selected in the simulation. For example, max BER is $10^{-4}$ here. |
| $BER_{min}$ | Min BER in the simulation | NA | The min BER selected in the simulation. For example, min BER is $10^{-16}$ here. |
| $\Delta \log BER$ | Step size of logBER in the simulation | NA | In the simulation, once $BER_{min}$ and $BER_{max}$ are decided, we could decide $\Delta BER$, which is $$\Delta \log BER = \frac{\log BER_{max} - \log BER_{min}}{Step_{total}}.$$ |
| $BER_{current}$ | The current BER in the simulation | NA | $BER_{current} = BER_{min} * 10^{Step * \Delta \log BER}$ |
| $Step_{total}$ | The total steps for the simulation. | NA | Here we choose $Step_{total}$ as 100. |
| Step | The current step during the simulation | NA | |
| $P_{sop}$ | Start of Packet symbol delimiter error probability | NA | |

TABLE I-continued

| Symbol | Parameter Description | Unit | Comment |
|---|---|---|---|
| $P_{pkt}$ | Packet error probability | NA | |
| $P_{eop}$ | End of Packet symbol delimiter error probability | NA | |
| P | A complete packet (including delimiters and packet itself) error probability | NA | |
| $P_{ack}$ | Acknowledge symbol error probability | NA | |
| $P_{burst\_bit\_err}$ | Burst bit error probability | NA | |
| $T_s$ | Time needed to send a packet | Seconds | |
| $T_r$ | Time needed to receive a packet (waiting and processing) | Seconds | |
| $T_{ack}$ | Time needed to send an acknowledge control symbol | Seconds | |
| $T_{prop}$ | Propagation time on the link | Seconds | |
| $T_{proc\_ack}$ | Time needed to process an acknowledge | Seconds | |
| $T_{recovery}$ | Time needed for error recovery, which is mainly the time for hardware error recovery and re-transmission time for the erroneous packet | Seconds | |
| $T_{link\_to}$ | Time for link timeout | Seconds | |
| $T_{link\_resync}$ | Time for link re-sync | Seconds | |
| $l_{sop}$ | Start of Packet symbol length | NA | This is a constant (30) in the simulation. |
| $l_{eop}$ | End of Packet symbol length | NA | This is a constant (30) in the simulation. |
| $l_{pkt}$ | Packet length | NA | This is a constant (2760) in the simulation. (The max length allowed by RIO protocol). |
| $l_{ack}$ | Acknowledge symbol length | NA | This is a constant (30) in the simulation. |
| N | Maximum Size of receiver queue | NA | This is a constant (16) in the simulation. |
| K | Size of receive queue when receiver gets (w + 1)th packet | NA | K could be 1 to 16. |
| $S_{exp\_rq}$ | Expected receive queue size | NA | $S_{exp\_rq} = \mathrm{ceiling}((w + 1)(T_r - T_s)/T_r)$ |

TABLE I-continued

| Symbol | Parameter Description | Unit | Comment |
|---|---|---|---|
| $P_{S_{rq}=K}$ | Probability of receive queue size being K. K could be 1 to 16. | NA | $P_{S_{rq}=K} = \begin{cases} 1 & K = S_{exp\_rq} \\ 0 & \text{otherwise} \end{cases}$ |
| $T_w$ | Window transfer time | Seconds | $T_w = (w+1)T_s + KT_r + T_{re\_cov\_ery} + T_{ack} + 2*T_{prop} + T_{proc\_ack} + P_{ack}T_{link\_to} + P_{burst\_bit\_err}T_{link\_resync}$ |
| $P_{effective}$ | The total effective packets transferred in the window | NA | $P_{effective} = w*(1-P)^w P$ |
| w | Correctly transferred packets in a window | NA | |
| D' | Throughput change at each step during the simulation | Packets/seconds | $D' = \sum_{K=1}^{N} \frac{P_{effective} * P_{S_{rq}=K}}{T_w}$ |
| D | Throughput of the window | Packets/seconds | $D = \sum_{w=0}^{\infty} D'$ |

Figure 3:
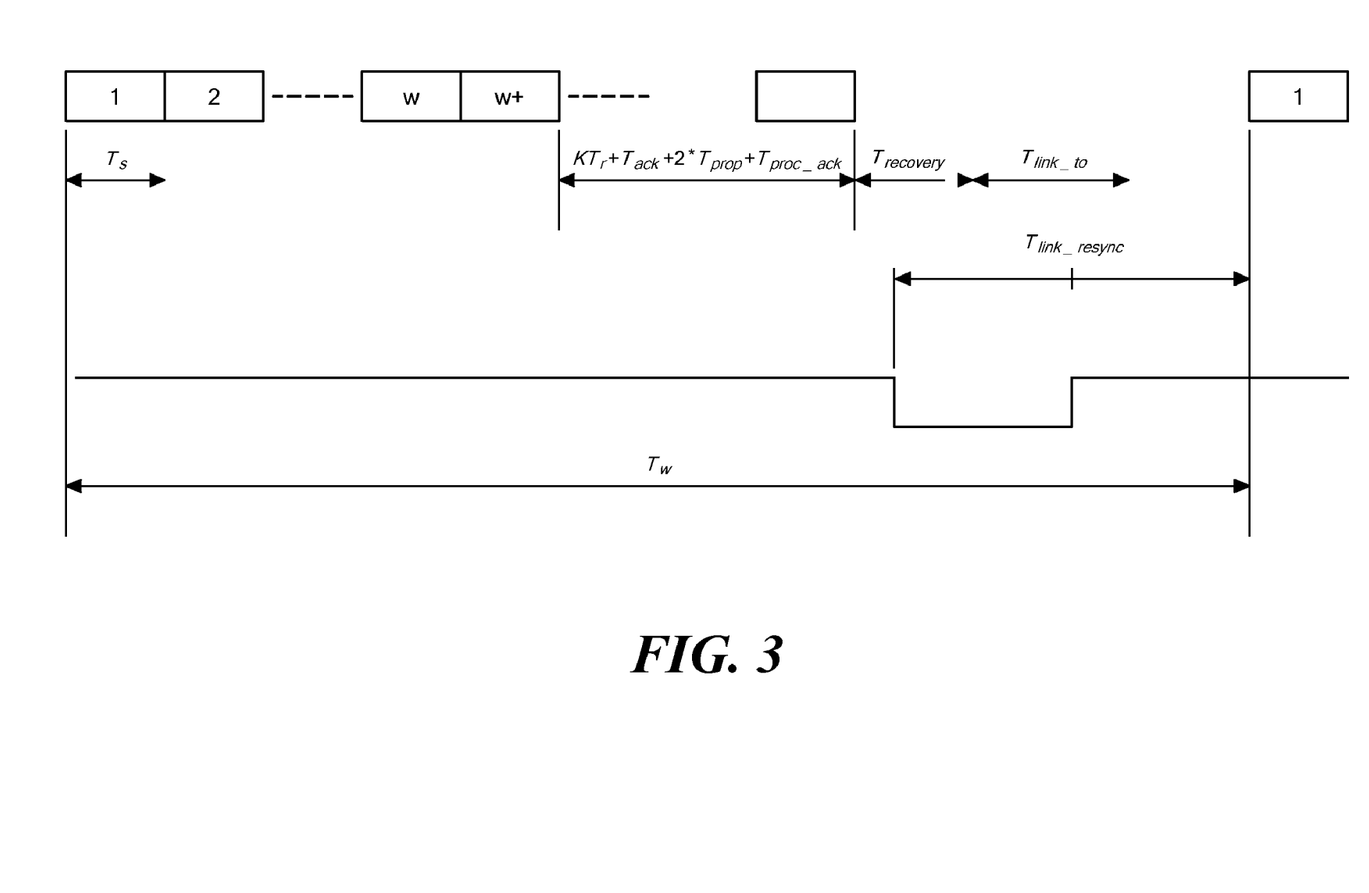
FIG. 3 is a diagram useful in understanding parameters for the communication system of FIG. 1.

Referring to FIG. 3, the mathematical model uses the concept of the "window transmission time" (WTT) to denote the average time needed for a complete window transmission. WTT denotes the average time taken from the beginning of window's first frame transmission to the beginning of next window's first frame transmission. WTT incorporates time needed for packet transmissions, waiting and processing time in the receiver queue, error recovery time, delays for possible link timeout and link re-sync time due to burst of bit errors.

The primary endpoint is sending w packets correctly when the bit error happens on (w+1)th packet. The total time spent on the transmission of these w+1 packets are (w+1)*$T_s$. Let's assume the erroneous packet enters the receive queue, there are K packets still in the receive buffer queue waiting to be processed. After the erroneous packet gets processed, the secondary endpoint sends out an acknowledgement (PNA) to the primary endpoint using another channel. Once PNA is received by the primary endpoint, the primary endpoint finishes the packet that it is transmitting and immediately entered the error-stop state. So the time between the finish of (w+1)th erroneous packet and the entering of recovery process is the waiting and processing time for the erroneous packet in the receive queue, which is K*$T_r$. Then recovery happens, which takes $T_{re\_cov\_ery}$ to finish. So generally, the total window time:

$$T_w = (w+1)T_s + KT_r + T_{re\_cov\_ery} + T_{ack} + 2*T_{prop} + T_{proc\_ack}$$

However, there are two special low probability cases which have very high impact on the link transmission. The first one is link timeout due to the bit error on the acknowledge control symbol. The link timeout is a long timer which has a maximum value of 3.4 seconds recommended by the Rapid IO Trade Association (TA). The second one is the link re-sync time. Link re-sync happens when there are burst of bit errors during a short period time. Link goes down and then goes up again. The time spent in silence and discovery states included in the link re-sync are 119.8 us and 12 ms, respectively. All these three timer will have a very big impact on $T_w$. Considering those timers:

$$T_w = (w+1)T_s + KT_r + T_{re\_cov\_ery} + T_{ack} + 2*T_{prop} + T_{proc\_ack} + P_{ack}T_{link\_to} + P_{burst\_bit\_err}T_{link\_resync}$$

The total effective packets transferred in the above window are:

$$P_{effective} = w*(1-P)^w P$$

While $$P = 1 - (1 - P_{sop})(1 - P_{pkt})(1 - P_{eop})$$

And $$P_{sop} = 1 - (1 - BER)^{lsop}$$

$$P_{eop} = 1 - (1 - BER)^{leop}$$

$$P_{pkt} = 1 - (1 - BER)^{lpkt}$$

$$P_{ack} = 1 - (1 - BER)^{lack}$$

So $$D = \sum_{w=0}^{\infty} \frac{(w(1-P)^w P)}{\left( \begin{array}{c} (w+1)T_s + KT_r + T_{recovery} + T_{ack} + 2*T_{prop} + \\ T_{proc\_ack} + P_{ack}T_{link\_to} + P_{burst\_bit\_err}T_{link\_resync} \end{array} \right)}$$

Here, we also have to consider the impact of K, which is a very important variable in the queuing theory. Let's assume $P_{S_{rq}=k}$ is the probability of receive queue size equaling a number K when the receiver gets the (w+1)th erroneous packet. Using continuous queuing model, $$P_{S_{rq}=K} = \begin{cases} 1 & K = S_{exp\_rq} \\ 0 & \text{otherwise} \end{cases}$$

The calculation of $S_{exp\_rq}$ is as follows:

$$S_{exp\_rq} = ceiling((w+1)(T_r-T_s)/T_r)$$

If $S_{exp\_rq} < 0$, then $S_{exp\_rq}=1$;
If $S_{exp\_rq} > N-1$, then $S_{exp\_rq}=N-1$;

So considering the difference probability of K, the throughput, D, equation becomes:

$$D = \sum_{w=0}^{\infty} \sum_{K=1}^{N} \frac{(w(1-P)^w P^* P_{S_{rq}=K})}{\begin{pmatrix}(w+1)T_s + KT_r + T_{recovery} + T_{ack} + 2^*T_{prop} + \\ T_{proc\_ack} + P_{ack}T_{link\_to} + P_{burst\_bit\_err}T_{link\_resync}\end{pmatrix}}$$

Eq. 1 where, as noted above, D is the normalized system throughput. For the SRIO protocol, the following parameters are the constants:
$l_{sop}=30$, $l_{eop}=30$, $l_{pkt}=2760$ for the maximum packet size, $l_{ack}=30$, $N=16$.
All other parameters could be considered as variables.

Depending on the definition of burst bit errors that brings link down, $P_{burst\_bit\_err}$ could be described as below:

$$P_{burst\_bit\_err} = 1 - (1-BER)^L - L^*BER^*(1-BER)^{L-1} - \frac{L^*(L-1)}{2}*BER^{2*}(1-BER)^{L-2}$$

where L=2560 which represents 256 code groups in sRIO protocol.

However, in the real system, once the first bit error happens, it is more likely the second one will happen. The same thing applies to the third bit error when the first and the second bit error happen. Therefore, in order to simplify the problem, we consider the following equation for calculating the burst bit error probability:

$$P_{burst\_bit\_err} = 1-(1-BER)^L$$

This means that one bit error definitely causes a burst of bit errors during 256 code groups.

Thus, a simple closed form equation (Eq 1), shown in FIG. 2 is derived for the throughput, D, of SRIO using a mathematical approach, namely the concept of window transmission time. The simple formula is easier to compute and allows better understanding of the throughput. For example, as noted above and referring to FIG. 2, it is noted that the calculated throughput, D, for the system is relatively flat as a function of BER until the knee-like region 15 of the function is reached after which the throughput decreases relatively rapidly with increasing BER. Thus, from such generated function, an optimal BER is established proximate the inflection point of the knee-like region 15 typically for safety, at a BER slightly less than the lower BER range of the knee-like region 15 or based on a desired percentage of the throughput ratio, $D/D_{max}$.

Figure 4:
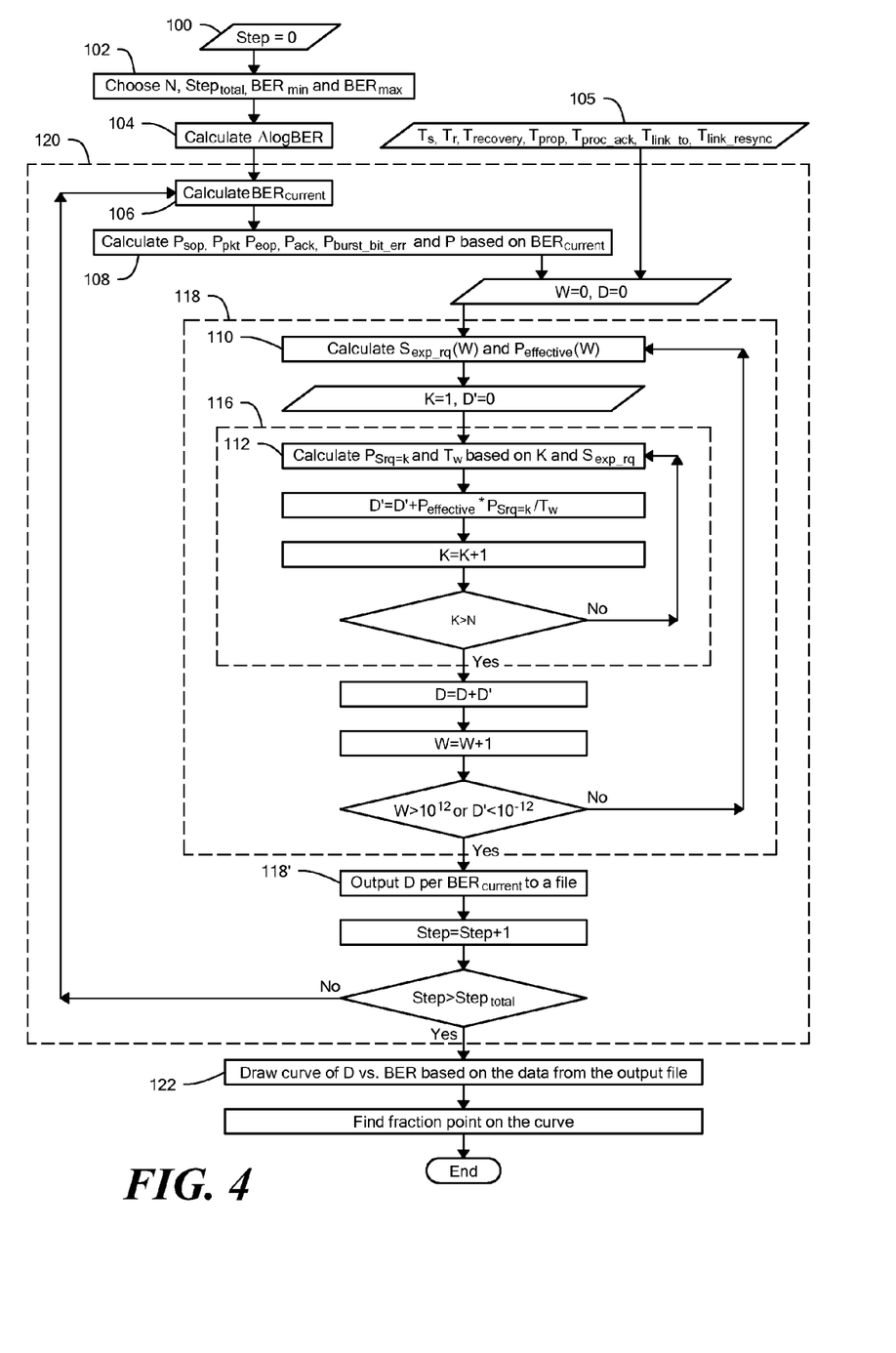
FIG. 4 is a flow chart of the steps used in the method according to the invention.

Referring now to FIG. 4, a flow chart of the process described above is shown, the terms used in the chart having been defined in Table I above.

The process begins with Step set equal to zero, block 100. Next, as shown in block 102, the user selects the number of Steps, $Step_{total}$, desired in the iterative process used to generate the function shown in FIG. 2, and the range of BERs over which the function is to be generated (i.e., a minimum BER, $BER_{min}$, and a maximum BER, $BER_{max}$).

Next, a calculation is made of $\Delta logBER$ where:

$$\Delta \log BER = \frac{\log BER_{max} - \log BER_{min}}{Step_{total}} = \frac{10}{100} = 0.1$$

More particularly, since the process using simulation to get the fraction point of the throughput, D, vs. logBER curve (FIG. 2) and get an idea at which point throughput will reduce dramatically, the user must first decide how many steps, $Step_{total}$, are to be used in the simulation. The user must also select the range over which the BER will be simulated, that is, $BER_{max}$ and $BER_{min}$. Here, in this example, $Step_{total}=100$, $BER_{max}=10^{-2}$ and $BER_{min}=10^{-12}$. Using the following equation, $$\Delta \log BER = \frac{\log BER_{max} - \log BER_{min}}{Step_{total}} = \frac{10}{100} = 0.1$$

Thus, the step length of logBER for the simulation is calculated. It is a constant. Also, the total receive buffer size, N, is determined, here in this example, N=16 and is also a constant in the simulation. The following table gives the $BER_{current}$ values at some selected steps. It is calculated based on:

$$BER_{current} = BER_{min} * 10^{\Delta logBer * Step}$$

| Step | $BER_{current}$ |
|---|---|
| 0 | 1E-12 |
| 1 | 1.26E-12 |
| 2 | 1.58E-12 |
| 3 | 2E-12 |
| 4 | 2.51E-12 |
| 5 | 3.16E-12 |
| 6 | 3.98E-12 |
| 7 | 5.01E-12 |
| 8 | 6.31E-12 |
| 9 | 7.94E-12 |
| 10 | 1E-11 |
| . | . |
| . | . |
| . | . |

The user must also specify parameters characteristic of the type of protocol used by the communication system. More particular, as shown in block 105, the user must specify:
$T_s$, $T_r$, $T_{recovery}$, $T_{prop}$, $T_{proc\_ack}$, $T_{link\_to}$, $T_{link\_resync}$ Calculation of Packet Related Probabilities, Burst Error Probability and Whole Packet Error Probability, Block 108

In response to the user inputs, the process calculates packet related error probabilities: $P_{sop}$, $P_{pkt}$ $P_{eop}$, $P_{ack}$, burst error probability, $P_{burst\_bit\_err}$ and the whole packet probability error.

More particularly, in block 108 the following:

$P_{sop}$, $P_{pkt}$, $P_{eop}$, $P_{ack}$, $P_{burst\_bit\_err}$ and P based on $BER_{current}$ More particularly, the process calculates packet related error probabilities: $P_{sop}$, $P_{pkt}$, $P_{eop}$, $P_{ack}$, as follows:

It is first noted that some packet related error probabilities are calculated based on $BER_{current}$. After $BER_{current}$ calculation from the previous step, now the error probabilities of packet delimiters and packet itself are calculated, which includes $P_{sop}$, $P_{eop}$, $P_{pkt}$ and $P_{ack}$. The total receiver buffer size N=16 and is a constant in the simulation. Same $Step_{total}$ and $BER_{min}$ and $BER_{max}$ are applied, which are:

$Step_{total}$=100

$BER_{max}$=$10^{-2}$ $BER_{min}$=$10^{-12}$ $$\Delta \log BER = \frac{\log BER_{max} - \log BER_{min}}{Step_{total}} = \frac{10}{100} = 0.1$$

The following table gives the values of $P_{sop}$, $P_{pkt}$, $P_{eop}$ and $P_{ack}$, based on the current BER value, where $P_{sop}=1-(1-BER_{current})^{l_{sop}}$, $l_{sop}$ is the length of packet delimiter (start of packet symbol).

$P_{eop}=1-(1-BER_{current})^{l_{eop}}$, $l_{eop}$ is the length of packet delimiter (end of packet symbol).

$P_{pkt}=1-(1-BER_{current})^{l_{pkt}}$, $l_{pkt}$ is the packet length.

$P_{ack}=1-(1-BER_{current})^{l_{ack}}$, $l_{ack}$ is the acknowledge symbol length.

| $BER_{current}$ | $P_{sop}$ | $P_{eop}$ | $P_{pkt}$ | $P_{ack}$ |
|---|---|---|---|---|
| 1E-12 | 3E-11 | 3E-11 | 2.76E-09 | 3E-11 |
| 1.26E-12 | 3.78E-11 | 3.78E-11 | 3.47E-09 | 3.78E-11 |
| 1.58E-12 | 4.75E-11 | 4.75E-11 | 4.37E-09 | 4.75E-11 |
| 2E-12 | 5.99E-11 | 5.99E-11 | 5.51E-09 | 5.99E-11 |
| 2.51E-12 | 7.54E-11 | 7.54E-11 | 6.93E-09 | 7.54E-11 |
| 3.16E-12 | 9.49E-11 | 9.49E-11 | 8.73E-09 | 9.49E-11 |
| 3.98E-12 | 1.19E-10 | 1.19E-10 | 1.1E-08 | 1.19E-10 |
| 5.01E-12 | 1.5E-10 | 1.5E-10 | 1.38E-08 | 1.5E-10 |
| 6.31E-12 | 1.89E-10 | 1.89E-10 | 1.74E-08 | 1.89E-10 |
| 7.94E-12 | 2.38E-10 | 2.38E-10 | 2.19E-08 | 2.38E-10 |
| 1E-11 | 3E-10 | 3E-10 | 2.76E-08 | 3E-10 |
| 1.26E-11 | 3.78E-10 | 3.78E-10 | 3.47E-08 | 3.78E-10 |
| 1.58E-11 | 4.75E-10 | 4.75E-10 | 4.37E-08 | 4.75E-10 |
| 2E-11 | 5.99E-10 | 5.99E-10 | 5.51E-08 | 5.99E-10 |
| . | . | . | . | . |
| . | . | . | . | . |

$P_{sop}$, $P_{pkt}$, $P_{eop}$, $P_{ack}$, $P_{burst\_bit\_err}$ and P based on $BER_{current}$ The process calculates burst error probability and the whole packet probability error, $P_{burst\_bit\_err}$ and P, respectively, as follows:

It is first noted that the burst error probability and the whole packet error probability are calculated based on $BER_{current}$. As before, the total receiver buffer size N=16, the total simulation steps $Step_{total}$=100, the maximum BER in the simulation $BER_{max}$=$10^{-2}$ and the minimum BER $BER_{max}$=$10^{-12}$. Based on those numbers, the process determines:

$$\Delta \log BER = \frac{\log BER_{max} - \log BER_{min}}{Step_{total}} = \frac{10}{100} = 0.1$$

Then:

$BER_{current}=BER_{min}*10^{\Delta \log BER * Step}$ $P_{burst\_bit\_err} =$
$1-(1-BER)^L - L*BER*(1-BER)^{L-1} - \frac{L*(L-1)}{2}*BER^{2*}(1-BER)^{L-2}$ In the above question, L=2560 represents 256 code groups in RIO serial link.

$P=1-(1-P_{sop})(1-P_{pkt})(1-P_{eop})$

While $P_{sop}=1-(1-BER_{current})^{l_{sop}}$ $P_{eop}=1-(1-BER_{current})^{l_{eop}}$ $P_{pkt}=1-(1-BER_{current})^{l_{pkt}}$ The following table gives the values of BER, burst error probability and the whole packet probability at some selected steps.

| Step | $BER_{current}$ | $P_{burst\_err\_prob}$ | P |
|---|---|---|---|
| 0 | 1E-12 | 2.76E-09 | 2.82E-09 |
| 1 | 1.26E-12 | 3.47E-09 | 0.001017 |
| 2 | 1.58E-12 | 4.37E-09 | 0.001334 |
| 3 | 2E-12 | 5.51E-09 | 0.001713 |
| 4 | 2.51E-12 | 6.93E-09 | 0.002281 |
| 5 | 3.16E-12 | 8.73E-09 | 0.002712 |
| 6 | 3.98E-12 | 1.1E-08 | 0.003347 |
| . | . | . | . |
| . | . | . | . |

Calculation of Throughput as a Function of BER, Block 118

The whole simulation consists of three loops. The most outer loop, block 120, changes BER from $BER_{min}$ to $BER_{max}$. The middle loop, block 118, increments w from 0 to infinity (practically a very big integer) and the most inner loop, block 116, increments K from 1 to the maximum receive buffer size N. Throughput D for each BER is calculated in the middle loop, 116.

The mathematical equation is shown as follows:

$$D = \sum_{w=0}^{\infty} \sum_{K=1}^{N} \frac{(w(1-P)^w P^* P_{Srq=K})}{\left( \begin{array}{c} (w+1)T_S + KT_r + T_{recovery} + T_{ack} + 2^*T_{prop} + \\ T_{proc\_ack} + P_{ack}T_{link\_to} + P_{burst\_bit\_err}T_{link\_resync} \end{array} \right)} =$$

$$\sum_{w=0}^{\infty} D' = \sum_{w=0}^{\infty} \sum_{K=1}^{N} \frac{P_{effective} * P_{S_{rq}=K}}{T_w}$$

Thus, having calculated the packet related error probabilities: $P_{sop}$, $P_{pkt}$, $P_{eop}$, $P_{ack}$, burst error probability, $P_{burst\_bit\_err}$ and the whole packet probability error P, as described above, the process sets w equal to 0, and D equal to 0, block 109 and the middle loop is performed as follows:

The process calculates $S_{exp\_rq}(w)$ and $P_{effective}(w)$, block 110, as follows:

$P_{effective} = w*(1-P)^w P$ $S_{exp\_rq} = ceiling((w+1)(T_r - T_s)/T_r)$;

The process sets K=1 and D'=0, block 111; and
The process performs the inner loop 116 as follows:

Block 112: The process calculates $P_{Srq=k}$ and $T_w$ based on K and $S_{exp\_rq}$. More particularly, In this box, the probability of receive queue size equaling to K and the effective packet transferring time of the window $T_w$ are calculated based on the value of K and the expected receive queue size $S_{exp\_rq}$. Here w=10

$P_{effective} = w*(1-P)^w P$ $S_{exp\_rq} = ceiling((w+1)(T_r - T_s)/T_r)$

Where $T_w = (w+1)T_s + KT_r + T_{recovery} + T_{ack} + 2*T_{prop} + T_{proc\_ack} + P_{ack}T_{link\_to} + P_{burst\_bit\_err}T_{link\_resync}$ $$P_{S_{rq}=K} = \begin{cases} 1 & K = S_{exp\_rq} \\ 0 & \text{otherwise} \end{cases}$$

Here
$T_s=1$, $T_r=0.9$, $T_{recovery}=2$, $T_{ack}=1$, $T_{prop}=0.5$, $T_{proc\_ack}=1$, $T_{link\_to}=10$, $T_{link\_resync}=1000$.

The following table shows the values of $T_w$ and $P_{Srq=k}$ when w=10 at $BER_{current}=10^{-10}$ and Step=20. From the flow chart, we could see that K is incremented from 1 to 16 at a fixed w (here w=10) value. The sum of $P_{Srq=k}$ when K is from 1 to 16 should equal to 1.

$P_{effective} * P_{S_{rq}=K}/T_w$ is the D' value at each K since $$D' = \sum_{K=1}^{N} \frac{P_{effective} * P_{Srq=K}}{T_w}.$$

| K | $T_w$ | $P_{Srq=k}$ | $P_{effective} * P_{S_{eq}=K}/T_w$ |
|---|---|---|---|
| 1 | 16.90028 | 1 | 1.67E−07 |
| 2 | 17.80028 | 0 | 1.67E−07 |
| 3 | 18.70028 | 0 | 1.67E−07 |
| 4 | 19.60028 | 0 | 1.67E−07 |
| 5 | 20.50028 | 0 | 1.67E−07 |
| 6 | 21.40028 | 0 | 1.67E−07 |
| 7 | 22.30028 | 0 | 1.67E−07 |
| 8 | 23.20028 | 0 | 1.67E−07 |
| . | . | . | . |
| . | . | . | . |
| . | . | . | . |

It is noted that $P_{effective}$ is the total effective packets transferred in the window, $S_{exp\_rq}$ is expected receive queue size and D' is throughput change at each step during the simulation. The equations for calculating those parameters are show as follows:

$P_{effective} = w*(1-P)^w P$ $S_{exp\_rq} = ceiling((w+1)(T_r - T_s)/T_r)$ $$D' = \sum_{K=1}^{N} \frac{P_{effective} * P_{S_{rq}=K}}{T_w}$$

While $T_w = (w+1)T_s + KT_r + T_{recovery} + T_{ack} + 2*T_{prop} + T_{proc\_ack} + P_{ack}T_{link\_to} + P_{burst\_bit\_err}T_{link\_resync}$ $T_s=1, T_r=0.9, T_{recovery}=2, T_{ack}=1, T_{prop}=0.5, T_{proc\_ack}=1, T_{link\_to}=10, T_{link\_resync}=1000$ The following table shows the values of those parameters at different values of w when $BER_{current}=10^{-10}$ at Step=20. From the flow chart, we could see that w is incremented from 0 to a very big number (it is infinity in the algorithm).

| w | $S_{exp\_rg}(W)$ | $P_{effective}(W)$ | D' |
|---|---|---|---|
| 1 | 1 | 2.82E−07 | 3.57E−08 |
| 10 | 1 | 2.82E−06 | 1.67E−07 |
| 100 | 1 | 2.82E−05 | 2.64E−07 |
| 1000 | 1 | 0.000282 | 2.8E−07 |
| 10000 | 1 | 0.002812 | 2.81E−07 |
| 100000 | 1 | 0.027416 | 2.74E−07 |
| 1000000 | 1 | 0.212705 | 2.13E−07 |
| 10000000 | 1 | 0.168089 | 1.68E−08 |
| . | . | . | . |
| . | . | . | . |
| . | . | . | . |

Having calculated calculates $P_{Srq=k}$ and $T_w$ based on K and $S_{exp\_rq}$, the process completes loop 116 by next calculating D'=D'+$P_{effective}*P_{Srq=k}/T_w$. Then setting K=K+1 and determining whether K>N. If not, the process returns to block 112. The loop 116 continues until K is greater than N.

Upon completion of the inner loop 116, the process performs the middle loop 118. Thus, D is equal to D+D' and w is equal to w+1.

Next the process determines whether w is greater than, in this example $10^{12}$ or D' is less than $10^{-12}$. It should be noted that in this simulation, we could not use infinity, which is impractical, so we have to establish a way to replace infinity. Based on the minimal BER selected, we could choose the maximal w that we would calculate up to or if D' (change of D) is very small, then we could stop simulation for this step. If one of these conditions is not met, the middle loop 116 continues and the process returns to block 110; on the other hand, if either condition is true, the process outputs the throughput D per $BER_{current}$ to a file, block 118; and the step is incremented Step=Step+1.

The outer loop 120 continues, i.e., the process returns to block 106 until Step is greater than $Step_{total}$.

Upon completion of the outer loop 120, the process draws a curve of throughput as a function of BER based on the data from the file, i.e., from block 118' (block 122), an exemplary curve being shown in FIG. 2. For example, referring to FIG. 2, it is noted that the calculated throughput for the system is relatively flat as a function of BER until a knee of the function is reached after which the throughput decreases relatively rapidly with increasing BER. Thus, from such generated function, a BER is established proximate the knee typically for safety, at a BER slightly less than the lower BER range of the knee. Here, the point X is selected as the desired BER for the exemplary system.

A number of embodiments of the invention have been described. Nevertheless, it will be understood that various modifications may be made without departing from the spirit and scope of the invention. Accordingly, other embodiments are within the scope of the following claims.

What is claimed is:

1. A method for designing a data communication system, comprising:
   (A) establishing a bit error rate (BER) requirement for the system, comprising:
      (1) generating a mathematical model of the functional relationship between throughput of data, D, passing from a transmitting one of a pair of end points of the data communication system and a receiving one of the pair of end points and a bit error rate of data received at the receiving one of the pair of end points; and establishing, from the generated model, the bit error rate (BER) requirement for the data communication system; where:

$$D = \sum_{w=0}^{\infty} \sum_{K=1}^{N} \frac{\left(w(1-P)^w P^r P_{S_{rq}=K}\right)}{\left((w+1)T_S + KT_r + T_{recovery} + T_{ack} + 2^*T_{prop} + T_{proc\_ack} + P_{ack}T_{link\_to} + P_{burst\_bit\_err}T_{link\_resync}\right)} =$$

$$\sum_{w=0}^{\infty} D' = \sum_{w=0}^{\infty} \sum_{K=1}^{N} \frac{P_{effective} * P_{S_{rq}=K}}{T_w}$$

and where:
   P: A complete packet (including delimiters and packet itself) error probability
   $P_{ack}$: Acknowledge symbol error probability
   $P_{burst\_bit\_err}$: Burst bit error probability
   $P_{S_{rq}=K}$: Probability of receive queue size being K. K could be 1 to 16.
   $P_{effective}$: The total effective packets transferred in the window
   $T_s$: Time needed to send a packet
   $T_r$: Time needed to receive a packet (waiting and processing)
   $T_{ack}$: Time needed to send an acknowledge control symbol
   $T_{prop}$: Propagation time on the link
   $T_{proc\_ack}$: Time needed to process an acknowledge
   $T_{re\,cov\,ery}$: Time needed for error recovery, which is mainly the time for hardware error recovery and re-transmission time for the erroneous packet
   $T_{link\_to}$: Time for link timeout
   $T_{link\_resync}$: Time for link re-sync
   $T_w$: Window transfer time
   K: Size of receive queue when receiver gets (w+1)th packet
   W: Correctly transferred packets in a window
   N: Maximum Size of receiver queue
   D': Throughput change at each step during the simulation; and
      (2) establishing bit error rate (BER) for the system from said generated function, and
   (B) producing the communication system using information from the established bit error rate (BER) requirement.

2. The method recited in claim 1 wherein model is represented by a curve relating system throughput as a function of the bit error rate, such curve having a substantially flat relationship between system throughput as a function of the bit error rate for first bit error rates and wherein the system throughput as a function of the bit error rate decreases from the first region for second bit error rates higher than the first bit rates with such curve having a knee-like region between the first bit error rates and the second bit error rates, and wherein the bit error rate is established at a bit error rate proximate an inflection point within the knee-like region.

3. The method recited in claim 2 wherein the bit error rate is established at a bit error rate slightly less than a lower bit error rate range of the knee-like region than an upper bit error rate range of the knee-like region or at a specified percentage of throughput.

\* \* \* \* \*